United States Patent Office 2,805,216
Patented Sept. 3, 1957

2,805,216

NEW COMPLEX COMPOUNDS OF PEPTIDES WITH ZINC

Herbert Keller, Beuel, Rhine, Germany, assignor to Chemie Grunenthal G. m. b. H., a corporation of Germany No Drawing. Application August 6, 1954, Serial No. 448,385

Claims priority, application Germany September 7, 1953

1 Claim. (Cl. 260—113)

The present invention relates to new complex compounds of peptides with zinc and to processes of preparing the said new compounds.

More particularly the present invention relates to the new products of the following general Formula I

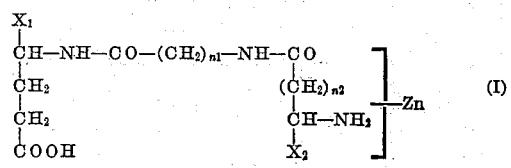

wherein $X_1$ and $X_2$ stand for members of the group consisting of hydrogen, alkyl-residues containing 1–3 carbon atoms, the groups —COOH, —CH$_2$COOH, —CH$_2$CH$_2$COOH and their salts and esters, at least one of the radicals $X_1$ and $X_2$ standing for a member of the group consisting of —COOH, —CH$_2$COOH, —CH$_2$CH$_2$COOH and their salts and esters, $n1$ and $n2$ stand for the numbers 1, 2 and 3 and Zn stands for a zinc-radical which is bound to the organic molecule in a complex form.

The preferred embodiment of the present invention relates to the products of the following general formula

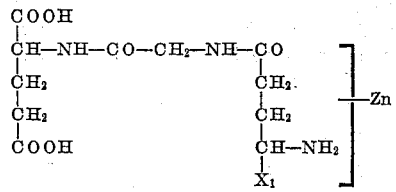

wherein $X_1$ stands for a member of the group consisting of hydrogen, the group —COOH, its salts and esters.

In the products of the invention the zinc-radical must be bound in a complex form. The proportions of the zinc-compound and the peptide-compound used as starting materials must accordingly be chosen in such a way, that in the final product all of the zinc is bound in a complex form, otherwise undesired by-products with toxic properties may be formed. Zinc is capable of reacting with 4 or 6 coordinative bonds. The peptide-compounds used according to the present invention as starting materials contain at least four groups that are capable of reacting with the formation of coordinative bonds. In general it is therefore advisable to react 1 molecule of the zinc compound used as starting material with 1 molecule of the peptide-compound, or to use a slight excess of the peptide-compound.

The products obtained in the above mentioned way may contain carboxylic acid groups that are still reactive. This depends on the number of the reactive groups contained in the starting materials, the quantity of zinc used for the reaction, and on other variables such as the pH-value of the reaction mixture. If reactive carboxylic acid groups are present in the final products, these may be transformed into functional derivatives such as salts or esters. For esterification purposes, one may use for instance sugars or polyvalent alcohols. In view of the fact that the products of the present invention are to be used as medicines, only such components should be used for the formation of salts or esters which are known to possess no pharmacologically undesired action.

The new products of the general formula mentioned before may be obtained by using starting materials prepared synthetically.

The synthetically prepared starting materials have not yet been described in literature. They may be prepared according to one of the following ways:

(a) 1- or d,1-glutaminyl-glycine is dissolved in acetic acid. Then there is added an equimolar quality of 1- or d,1-glutamic acid anhydride, the amino-group of which is protected according to one of the known methods, for instance by substituting it with a residue that may be easily split off again. After the reaction mixture has become clear the acetic acid is neutralized and the amino-group mentioned before is set free, for instance by splitting-off the substituent. In this way a tri-peptide is obtained that may be used as the starting material for the formation of the complex zinc compound. One may isolate the tri-peptide from the reaction mixture in solid form or use it primarily obtained solution as starting material for obtaining the zinc complex compounds of the present invention.

(b) Instead of the glutaminyl glycine a corresponding ester, as for instance the ethyl-di-ester, can be used as starting material. In this case the tri-peptide obtained possesses ester-groupings. The saponification of the ester-groupings may be carried out after the formation of the tri-peptide, either with regard to all ester-groups being present in the molecule or with regard to such portion of the ester groups that in any case the zinc used in the reaction is bound in a complex form. The ester may be saponified, for instance by treating the intermediate product obtained in the first stage of the process, i. e. before the setting free of the amino-group, with an alkaline lye such as caustic soda at a low temperature. In the residue, the amino-group may be split off if desired in the following stage.

Preferably such peptide compounds are used as starting materials as contain in their molecule one or two glutamic acid radicals. Products with particularly good pharmacological properties are obtainable from starting materials of the following general formula

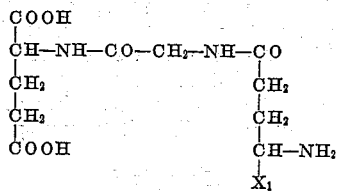

wherein $X_1$ stands for hydrogen or a carboxylic acid group or a salt or an ester thereof.

In order to obtain the complex peptide-zinc-products, the tri-peptides obtainable according to any one of the methods mentioned before are reacted with a suitable zinc-compound, as for instance a hydroxide, carbonate or acetate of zinc. This reaction is preferably carried out in the presence of a solvent which is capable of dissolving at least one of the two reaction components. If possible a solvent should be used that is capable of dissolving the final product. When using such a solvent, a clear solution is obtained during the reaction even if the starting materials are not dissolved at the beginning. The best solvent for the reaction is in general water.

When using a low reaction temperature it is in many instances possible to separate isomeric products formed in the reaction by taking advantage of the different solubilities of the isomeric products.

The formation of the complex-compounds is in general facilitated by using a slightly elevated temperature.

The complex compounds may be isolated from the reaction mixture by diluting the reaction mixture with an organic solvent in which the complex compound is difficultly soluble, such as acetone, methanol or ethanol, or by salting out the complex compound from the reaction mixture by adding more soluble salts, as for instance sodium chloride or ammonium sulfate, or by converting complex compounds containing free carboxylic acid groups into difficultly soluble salts, as for instance the barium salt. In the last case the difficultly soluble salts may be transformed again later on, if this should be desired, into more soluble products. When isolating the complex compounds, for instance in the form of the barium salts, the more soluble products can be obtained by reacting the barium-salts with an equivalent quantity of sulphuric acid. The complex zinc compounds may also be isolated from their aqueous solutions by adding relatively small quantities of an organic solvent, as for instance ethanol, and causing the complex compound thereby to crystallize out. Another way of isolating the complex zinc compounds comprises the removal of the solvents or diluents under vacuum or by way of freeze-drying. The complex compounds may be dissolved and isolated repeatedly if a more complete purification is desired.

The final products may consist in some cases of different stereo-isomeric compounds. If it is desired to separate the different isomeric products one may cause the complex compound purified according to one of the methods described before to react with optically active forms of organic bases such as brucin. In many instances it is possible to separate in this way the optically pure forms. In general the optically pure forms differentiate from each other in certain physical properties, as for instance the solubility in solvents. The complex compounds may be separated from the organic bases used in the above mentioned process by reacting the salts of the complex products and the organic bases with a suitable acid such as sulphuric acid.

The products of the present invention possess valuable pharmacological properties. They possess a favourable action with regard to excitement states of central origin. For instance, poisonings caused by pentamethylene-tetrazol, the lethal effect of which would otherwise be certain, may be counteracted by the use of small quantities of the zinc complex compound. Also the convulsion threshold of the cerebrum when subjected to electrically induced convulsions may be considerably raised if small quantities of a compound according to the present invention are administered before the electric stimulation is applied. The following examples are to illustrate the invention but not to limit it to any specific way or procedure.

Example 1

The tri-peptide of the following formula

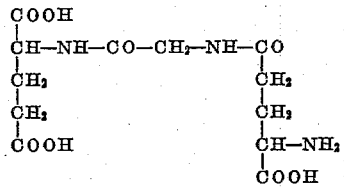

may be prepared according to the following method: 2.04 g. of l- or d,l-glutaminyl-glycine are dissolved in 50 cc. of hot glacial acetic acid. Then there are added 2.6 g. of phthalyl-glutamic-acid-anhydride. After the solution has become clear it is slowly cooled and left at room temperature for 30 minutes. Then the glacial acetic acid is evaporated under vacuum until a syrupy, blistered mass is obtained. To this are added 30 cc. of absolute ethyl alcohol containing 0.5 cc. hydrazine hydrate, and the reaction mixture is left at room temperature for at least 12 hours. Then the alcohol is removed under vacuum at a moderate temperature. The residue is diluted with 50 cc. of water and acetic acid is added up to pH 5. The suspension obtained is heated for an hour on a boiling water-bath, cooled to room temperature and carefully filtered. The clear pale-yellow filtrate is reduced to 20 percent of its volume and slowly diluted with about four times the quantity of ethyl alcohol. The milky fluid obtained is diluted with the same quantity of acetone. From this mixture the tri-peptide precipitates at a low temperature and may be separated by filtration.

The yield amounts to more than 90 percent of the theoretical. 8.63 g. of $ZnSO_4.7H_2O$ are dissolved in 100 cc. of water. Then there are added 60 cc. of N-sodium hydrate. The precipitating jelly-like substance is separated by filtration and washed several times with water. The obtained zinc-hydroxide-gel is added to a solution of 10 g. tripeptide in 500 cc. of water and the reaction mixture is slowly warmed under stirring which is continued until the gel is dissolved. During this process the color of the reaction mixture changes from pale-yellow to greenish-yellow. At the same time a precipitate is formed which is contrary to the gel character of the zinc hydroxide, of a granulated character. After about 20 minutes the reaction is finished to the extent desired. The mixture is slowly cooled and the sediment is separated by filtration. The final compound may be isolated from the clear filtrate by diluting it with acetone in the proportion of 1:5.

The compound obtained according to the above described process is hydroscopic, easily soluble in water and pyridine and difficulty soluble or insoluble in methanol, ethanol and higher alcohols. Its aqueous solution may be sterilized. If the product is intended to be stored or administered in the dry form it may be converted into a salt or an ester, since it contains free reactive groups.

What I claim is:

The new product of the following structural formula

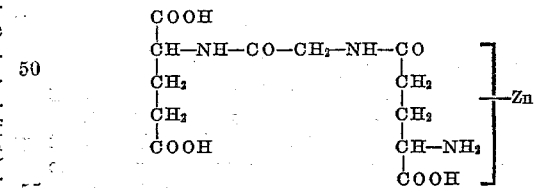

wherein Zn stands for a zinc-radical being bound to the organic molecule in a complex form.

References Cited in the file of this patent

UNITED STATES PATENTS

| | | |
|---|---|---|
| 698,694 | Eichengrun et al. | Apr. 29, 1902 |
| 2,014,167 | Bowen | Sept. 10, 1935 |
| 2,103,153 | Dunham | Dec. 21, 1937 |

OTHER REFERENCES

Hove et al.: J. Biol. Chem., vol. 136, pp. 425–34 (1940).

Cohn et al.: "Proteins Amino Acids and Peptides" (Reinhold, ACS Monograph No. 90), pp. 619–22 (1943).